(12) United States Patent
Kurita (10) Patent No.: US 9,363,555 B2
(45) Date of Patent: Jun. 7, 2016

(54) RECEIVING APPARATUS, PACKET-BOUNDARY DETERMINATION METHOD, AND COMPUTER PROGRAM

(71) Applicant: SONY CORPORATION, Tokyo (JP)

(72) Inventor: Mitsuharu Kurita, Tokyo (JP)

(73) Assignee: SONY CORPORATION, Tokyo (JP)

(*) Notice: Subject to any disclaimer, the term of this patent is extended or adjusted under 35 U.S.C. 154(b) by 95 days.

(21) Appl. No.: 14/279,784

(22) Filed: May 16, 2014

(65) Prior Publication Data

US 2014/0355460 A1 Dec. 4, 2014

(30) Foreign Application Priority Data

May 28, 2013 (JP) ................................. 2013-111814

(51) Int. Cl.
*H04J 3/06* (2006.01)
*H04N 21/4385* (2011.01)
*H04L 29/06* (2006.01)
*H04L 29/08* (2006.01)

(52) U.S. Cl.
CPC .......... *H04N 21/4385* (2013.01); *H04L 65/601* (2013.01); *H04L 65/604* (2013.01); *H04L 67/02* (2013.01)

(58) Field of Classification Search
None
See application file for complete search history.

(56) References Cited

U.S. PATENT DOCUMENTS

| 5,974,104 | A | * | 10/1999 | Dhara | H04J 3/0608 370/509 |
|---|---|---|---|---|---|
| 6,154,468 | A | * | 11/2000 | Lin | H04N 21/4385 370/510 |
| 6,816,928 | B1 | * | 11/2004 | Yoshii | H04L 49/103 710/36 |
| 8,170,210 | B2 | * | 5/2012 | Manders | H04N 5/783 380/217 |
| 8,594,491 | B2 | * | 11/2013 | Kato | G11B 20/1217 386/326 |
| 2010/0054280 | A1 | * | 3/2010 | Edmiston | H04L 12/5602 370/476 |

FOREIGN PATENT DOCUMENTS

| JP | H07-079219 A | 3/1995 |
|---|---|---|
| JP | 2000-507785 A | 6/2000 |

* cited by examiner

*Primary Examiner* — Anh-Vu Ly
(74) *Attorney, Agent, or Firm* — Chip Law Group (57) ABSTRACT

There is provided a receiving apparatus including a position detection unit configured to detect a position at which same information as predetermined synchronous information is present from an acquired stream, and a boundary determination unit configured to determine positions at which the same information as the synchronous information detected by the position detection unit appears N times, where N>1, again and again in N cycles each of which is equal to a packet length, as a packet boundary position of the stream. The boundary determination unit determines the packet boundary position on the basis of a packet-boundary-position likelihood of the positions of the same information as the synchronous information in a case where the packet boundary position is unable to be uniquely located.

8 Claims, 9 Drawing Sheets

RECEIVING APPARATUS, PACKET-BOUNDARY DETERMINATION METHOD, AND COMPUTER PROGRAM

CROSS REFERENCE TO RELATED APPLICATIONS

This application claims the benefit of Japanese Priority Patent Application JP 2013-111814 filed May 28, 2013, the entire contents of which are incorporated herein by reference.

BACKGROUND

The present disclosure relates to a receiving apparatus, a packet-boundary determination method, and a computer program.

In circumstances in which fixed-length data packets are transmitted as a byte stream, the position of byte data (a synchronous byte) of a specific value can identify a packet boundary position. For example, JP 2000-507785T discloses a technique of accurately finding out a packet boundary by accumulating byte data of a length corresponding to the certain number of packets (defined as "N") and by determining a position at which a synchronous byte appears the N times in N cycles each of which is just equal to a packet length, as a packet boundary position.

If the value used as that of the synchronous byte does not appear at the other position in each packet, the above-described technique enables locating a correct boundary position. However, the same value as that of the synchronous byte often appears at the same position in each of a plurality of packets other than the packet boundary position by coincidence, in which case, it may be difficult to discriminate a true boundary position from a false boundary position. This phenomenon is generally referred to as "emulation."

To address this emulation, as disclosed, for example, in JP H7-79219A, there is known a technique for facilitating distinguishing the true boundary position from the false boundary position or the emulated position resulting from this emulation by determining to arrange a byte or a byte sequence of a certain value at another position besides an existing synchronous byte and confirming whether the byte or the byte sequence of the certain value matches a preset byte or byte sequence.

SUMMARY

With the existing technique for addressing the emulation, the byte or byte sequence of the certain value is arranged at another position besides the synchronous byte. This disadvantageously increases the occupancy of a fixed-value field in each packet, resulting in degradation in data transmission efficiency per packet.

The present disclosure provides a novel and improved receiving apparatus, a packet-boundary determination method, and a computer program capable of determining a packet boundary position without increasing occupancy of a fixed-value field and degrading data transmission efficiency per packet.

According to an embodiment of the present disclosure, there is provided a receiving apparatus including a position detection unit configured to detect a position at which same information as predetermined synchronous information is present from an acquired stream, and a boundary determination unit configured to determine positions at which the same information as the synchronous information detected by the position detection unit appears N times, where N>1, again and again in N cycles each of which is equal to a packet length, as a packet boundary position of the stream. The boundary determination unit determines the packet boundary position on the basis of a packet-boundary-position likelihood of the positions of the same information as the synchronous information in a case where the packet boundary position is unable to be uniquely located.

According to another embodiment of the present disclosure, there is provided a packet-boundary determination method including detecting a position at which same information as predetermined synchronous information is present from an acquired stream, and determining positions at which the same information as the synchronous information detected in the detecting appears N times, where N>1, again and again in N cycles each of which is equal to a packet length, as a packet boundary position of the stream. In the determining, the packet boundary position is determined on the basis of a packet-boundary-position likelihood of the positions of the same information as the synchronous information in a case where the packet boundary position is unable to be uniquely located.

According to another embodiment of the present disclosure, there is provided a computer program causing a computer to execute detecting a position at which same information as predetermined synchronous information is present from an acquired stream, and determining positions at which the same information as the synchronous information detected in the detecting appears N times, where N>1, again and again in N cycles each of which is equal to a packet length, as a packet boundary position of the stream. In the determining, the packet boundary position is determined on the basis of a packet-boundary-position likelihood of the positions of the same information as the synchronous information in a case where the packet boundary position is unable to be uniquely located.

As described so far, according to one or more of the embodiments of the present disclosure, it is possible to provide the novel and improved receiving apparatus, the packet-boundary determination method, and the computer program capable of determining the packet boundary position without increasing the occupancy of the fixed-value field and degrading the data transmission efficiency per packet.

DETAILED DESCRIPTION OF THE EMBODIMENT(S)

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The present disclosure is described in the following order.
<1. One Embodiment of Present Disclosure>
[System Configuration]
[Functional Configuration of Receiving Apparatus]
[Functional Configuration of Data Processing Unit]
[Operations of Receiving Apparatus]
<2. Hardware Configuration>
<3. Conclusion>

1. One Embodiment of Present Disclosure

[System Configuration]

Figure 1:
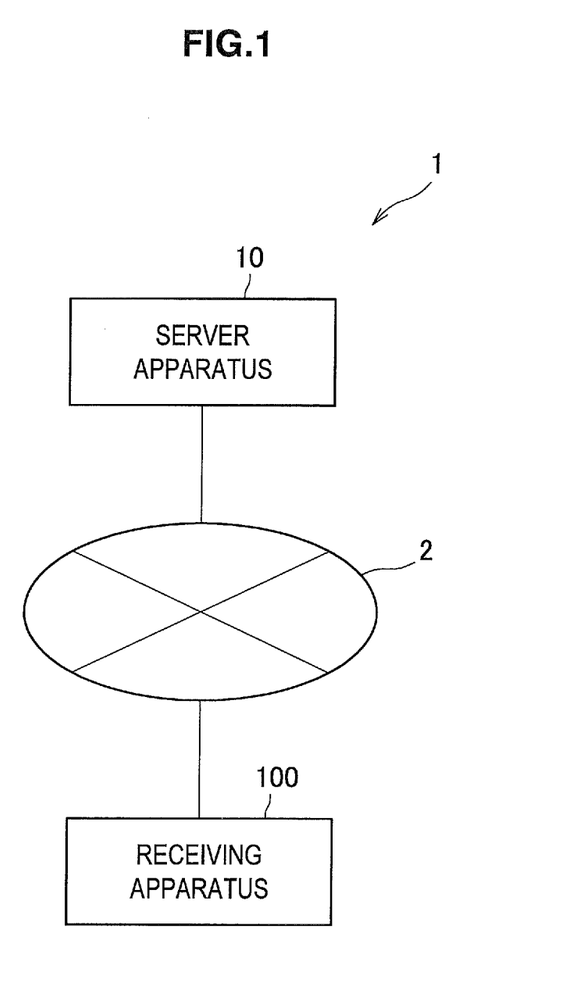
FIG. 1 is an explanatory diagram showing an example of a configuration of a transmission system 1 according to one embodiment of the present disclosure.

First, an example of a configuration of a system according to one embodiment of the present disclosure is described with reference to figures. FIG. 1 is an explanatory diagram showing an example of a configuration of a transmission system 1 according to one embodiment of the present disclosure. The example of the configuration of the transmission system 1 according to the embodiment of the present disclosure is described below with reference to FIG. 1.

As shown in FIG. 1, the transmission system 1 according to the embodiment of the present disclosure is configured to include a server apparatus 10 and a receiving apparatus 100. The server apparatus 10 and the receiving apparatus 100 are connected to a network 2 such as the Internet.

The server apparatus 10 is an apparatus that sends a stream constituted by data packets at a fixed length to the network 2 in the form of a byte stream. The receiving apparatus 100 is an apparatus that receives, from the network 2, the stream constituted by the data packets at the fixed length and transmitted from the server apparatus 10 in the form of the byte stream, and that executes processes based on the stream.

For example, the server apparatus 10 may be an apparatus that outputs video contents to the network 2 in an MPEG-2 TS format, and the receiving apparatus 100 may be an apparatus that receives, from the network 2, the video contents output from the server apparatus 10 in the MPEG-2 TS format and that outputs the video contents. Needless to say, functions of the server apparatus 10 and the receiving apparatus 100 are not limited to those exemplarily described above. Embodiments described below are applicable as long as the receiving apparatus 100 receives the stream constituted by the data packets at the fixed length output from the server apparatus 10 and transmitted in the form of the byte stream.

Subsequently to the description of the example of the configuration of the transmission system 1 according to the embodiment of the present disclosure, an example of a functional configuration of the receiving apparatus 100 according to one embodiment of the present disclosure is described.

[Functional Configuration of Receiving Apparatus]

Figure 2:
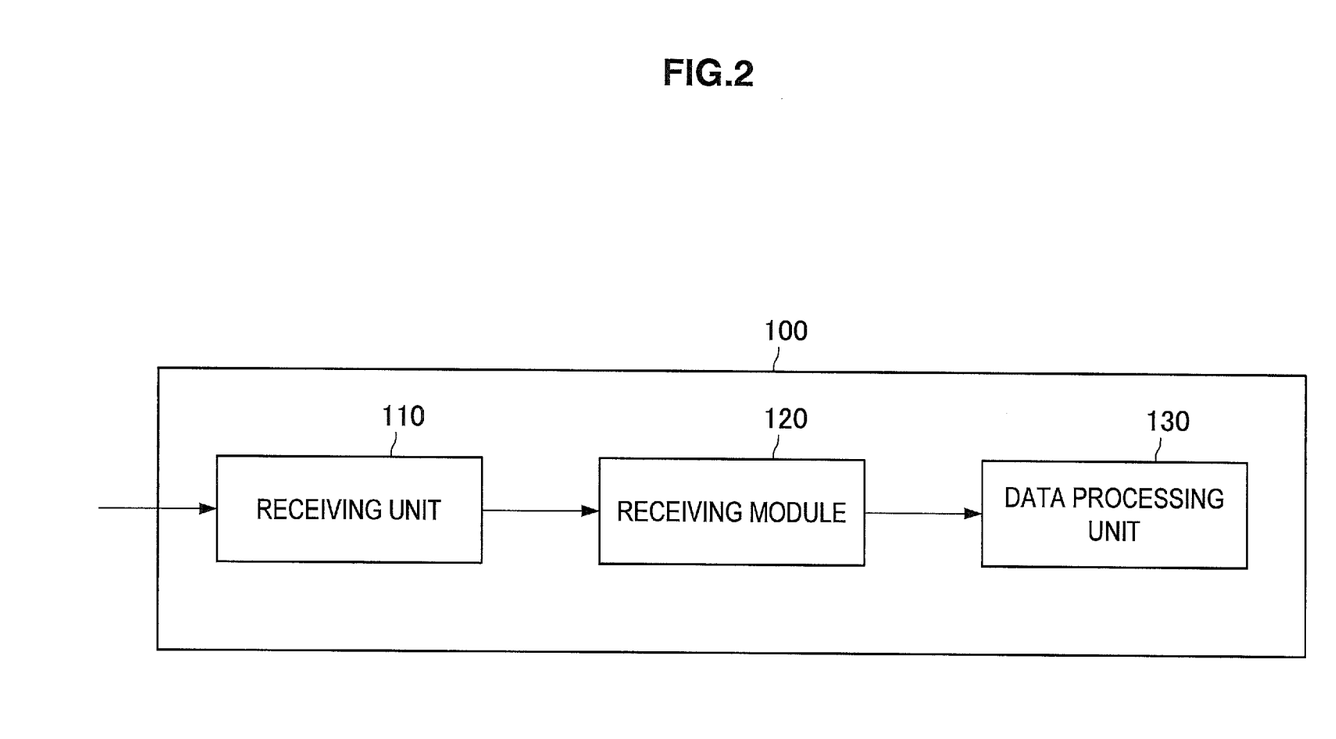
FIG. 2 is an explanatory diagram showing an example of a functional configuration of a receiving apparatus 100 according to one embodiment of the present disclosure.

FIG. 2 is an explanatory diagram showing the example of the functional configuration of the receiving apparatus 100 according to one embodiment of the present disclosure. The example of the functional configuration of the receiving apparatus 100 according to the embodiment of the present disclosure is described with reference to FIG. 2.

The receiving apparatus 100 shown in FIG. 2 is an apparatus that receives the stream constituted by the data packets at the fixed length and transmitted from the server apparatus 10 in the form of the byte stream, and that executes the processes based on the stream. As shown in FIG. 2, the receiving apparatus 100 is configured to include a receiving unit 110, a receiving module 120, and a data processing unit 130.

The receiving unit 110 is an interface for receiving, from the network 2, the stream constituted by the data packets at the fixed length and transmitted from the server apparatus 10 in the form of the byte stream. The receiving unit 110 sends the stream received from the network 2 to the receiving module 120.

The receiving module 120 performs an A/D conversion process or the like on the stream sent from the receiving unit 110 and sends the converted stream to the data processing unit 130.

The data processing unit 130 executes processes on the stream sent from the receiving module 120. The processes executed by the data processing unit 130 include determining a packet boundary position by detecting a position of byte data (a synchronous byte) of a specific value from each acquired divided stream, extracting packets from the stream on the basis of the determined boundary position, executing the display of video contents and other operations based on data on the extracted packets, and the like. A detailed configuration of the data processing unit 130 is described later in detail.

Figure 3:
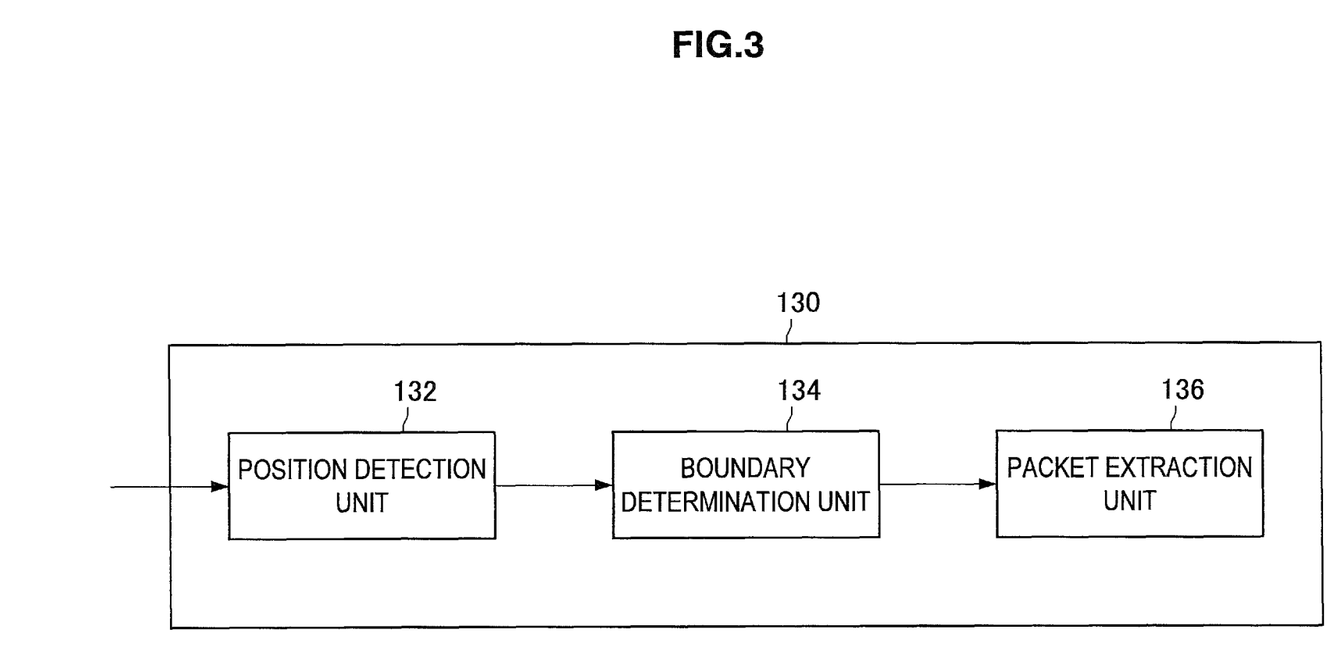
FIG. 3 is an explanatory diagram showing an example of a functional configuration of a data processing unit 130 included in the receiving apparatus 100 according to one embodiment of the present disclosure.

Subsequently to the description of the example of the functional configuration of the receiving apparatus 100 according to the embodiment of the present disclosure with reference to FIG. 2, an example of a functional configuration of the data processing unit 130 included in the receiving apparatus 100 according to one embodiment of the present disclosure is described.

[Functional Configuration of Data Processing Unit]

FIG. 3 is an explanatory diagram showing the example of the functional configuration of the data processing unit 130 included in the receiving apparatus 100 according to one embodiment of the present disclosure. The example of the functional configuration of the data processing unit 130 is described with reference to FIG. 3.

As shown in FIG. 3, the data processing unit 130 is configured to include a position detection unit 132, a boundary determination unit 134, and a packet extraction unit 136.

The position detection unit 132 accumulates byte data of a length corresponding to certain packets, and detects positions at which the same data as that specified as the synchronous byte is present, from the stream sent from the receiving module 120 to the data processing unit 130. The position detection unit 132 sends the stream and information on the positions at which the same data as the synchronous byte is present, to the boundary determination unit 134.

The boundary determination unit 134 determines a packet boundary position in the stream received by the receiving apparatus 100 using the stream and the information on the positions at which the same data as the synchronous byte is present, that are sent from the position detection unit 132. If present are positions at which the same data as the synchronous byte appears again and again in cycles each of which is equal to a packet length, the boundary determination unit 134 can determine the positions as the packet boundary position.

The position detection unit 132 detects the positions at which the same value as that of the synchronous byte appears from the stream sent to the data processing unit 130, and sends a result of the detection to the boundary determination unit 134. If the number of positions at which the same value as that of the synchronous byte appears in each cycle equal to the packet length, is one, the boundary determination unit 134 can easily judge that the position is the packet boundary position.

However, the number of positions at which the same value as that of the synchronous byte appears in each cycle equal to the packet length, is not one but two or more, it is difficult for the boundary determination unit 134 to judge where the packet boundary position is.

Considering the above, the boundary determination unit 134 according to the embodiment of the present disclosure determines which location has a highest packet-boundary-position likelihood and determines the packet boundary position on the basis of the determination if the same value as that of the synchronous byte appears in a plurality of locations in cycles each of which is equal to the packet length. A method of determining the packet boundary position according to the embodiment of the present disclosure is described later in detail.

The packet extraction unit 136 extracts packets from the stream sent to the data processing units 130 on the basis of the packet boundary position determined by the boundary determination unit 134. The receiving apparatus 100 can execute the display of video contents and the other operations based on the packets extracted by the packet extraction unit 136.

Figure 4:
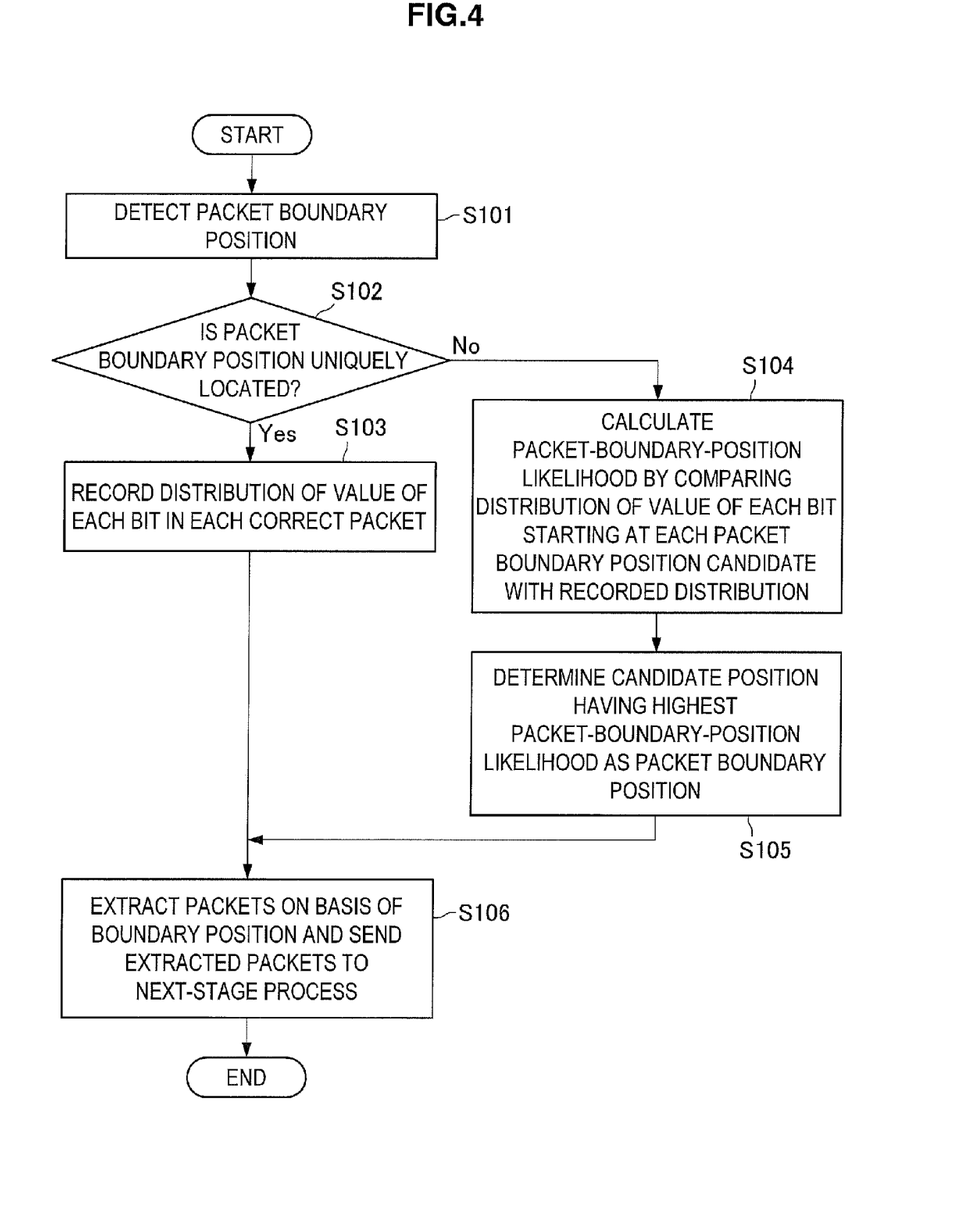
FIG. 4 is a flowchart showing an example of operations of the receiving apparatus 100 according to one embodiment of the present disclosure.

Subsequently to the description of the example of the functional configuration of the data processing unit 130 included in the receiving apparatus 100 according to the embodiment of the present disclosure, an example of the operations of the receiving apparatus 100 according to one embodiment of the present disclosure is described.

[Operations of Receiving Apparatus]

FIG. 4 is a flowchart showing the example of the operations of the receiving apparatus 100 according to one embodiment of the present disclosure. FIG. 4 shows the example of the operations of the receiving apparatus 100 when the receiving apparatus 100 determines the packet boundary position and extracts the packets from the stream received from the network 2. The example of the operations of the receiving apparatus 100 according to the embodiment of the present disclosure is described with reference to FIG. 4.

The receiving apparatus 100 detects the packet boundary position by detecting the positions at which the same data as the synchronous byte is present in a cycle equal to the packet length, from the stream received from the network 2 (Step S101). For example, the position detection unit 132 and the boundary determination unit 134 may execute this boundary-position detection process.

The position detection unit 132 accumulates the byte data of the length corresponding to the certain number of packets (defined as "N"), and detects the position at which the same data as the synchronous byte appears the N times in N cycles each of which is just equal to the packet length. The boundary determination unit 134 determines the position at which the same data as the synchronous byte appears as the packet boundary position.

Figure 5:
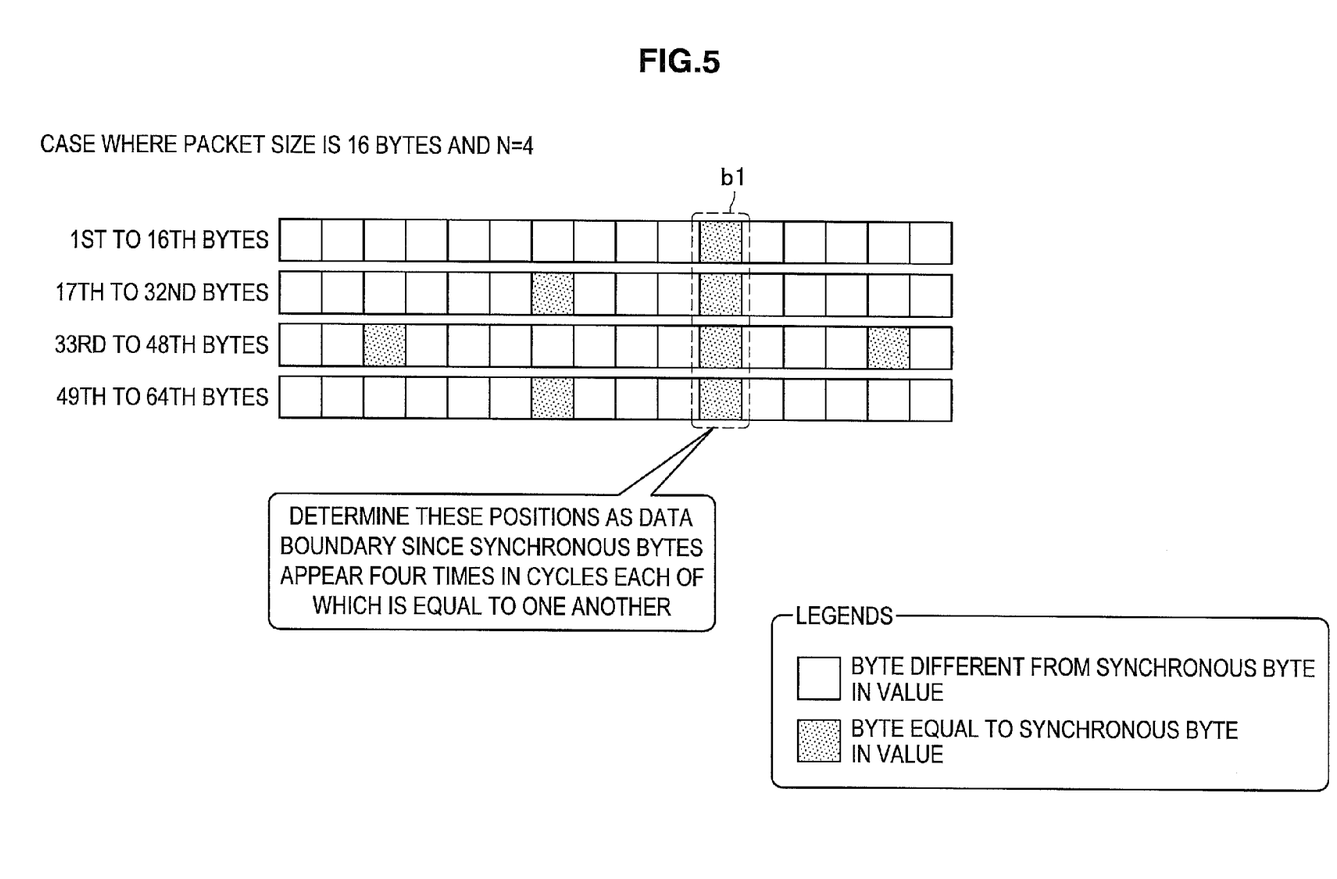
FIG. 5 is an explanatory diagram showing an example of byte data.

FIG. 5 is an explanatory diagram showing an example of byte data corresponding to four packets in a case where a size of one packet is 16 bytes and where N=4. In the example shown in FIG. 5, the same data as the synchronous byte appears at eleventh byte, 27th byte, 43rd byte, and 59th byte. As shown in FIG. 5, if the bytes of the same value as that of the synchronous byte appear N times, where N=4, again and again at the same position in four 16-byte cycles, and if another byte of the same value as that of the synchronous byte does not appear in the four 16-byte cycles, the boundary determination unit 134 determines the positions of the bytes having the same value as that of the synchronous byte in 16-byte cycles as the packet boundary position.

Next, the receiving apparatus 100 determines whether the packet boundary position is uniquely located by the detection of the packet boundary position in Step S101 (Step S102). For example, the boundary determination unit 134 may execute the determination process in Step S102. If the packet boundary position is uniquely located by the detection of the packet boundary position in Step S101, the receiving apparatus 100 records a distribution of a value of each bit in each packet (Step S103). For example, the boundary determination unit 134 may execute this recording process in Step S103.

The receiving apparatus 100 extracts the packets on the basis of the determined packet boundary position and sends the extracted packets to a process in a next stage (Step S106). For example, the packet extraction unit 136 may execute this packet extraction process in Step S106.

Figure 6:
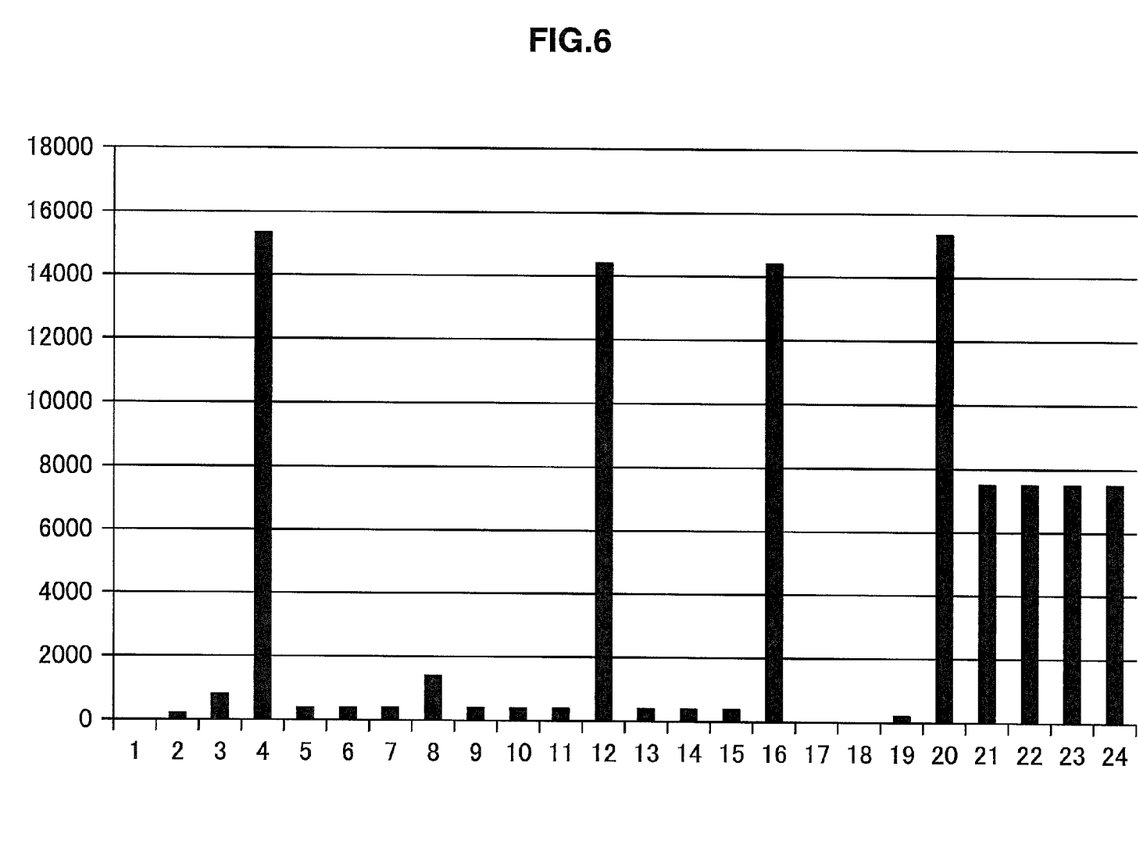
FIG. 6 is an explanatory diagram showing an example of a histogram.

By recording the distribution of the value of each bit in each of a plurality of packets and extracting the packet, the receiving apparatus 100 can generate a histogram indicating an appearance frequency of 1 (or 0) at a position of each bit in the correctly extracted packets. FIG. 6 is an explanatory diagram showing an example of the histogram indicating the appearance frequency of 1 at the position of each bit among 24 bits at and after the packet boundary position in a certain packet sequence.

Figure 7:
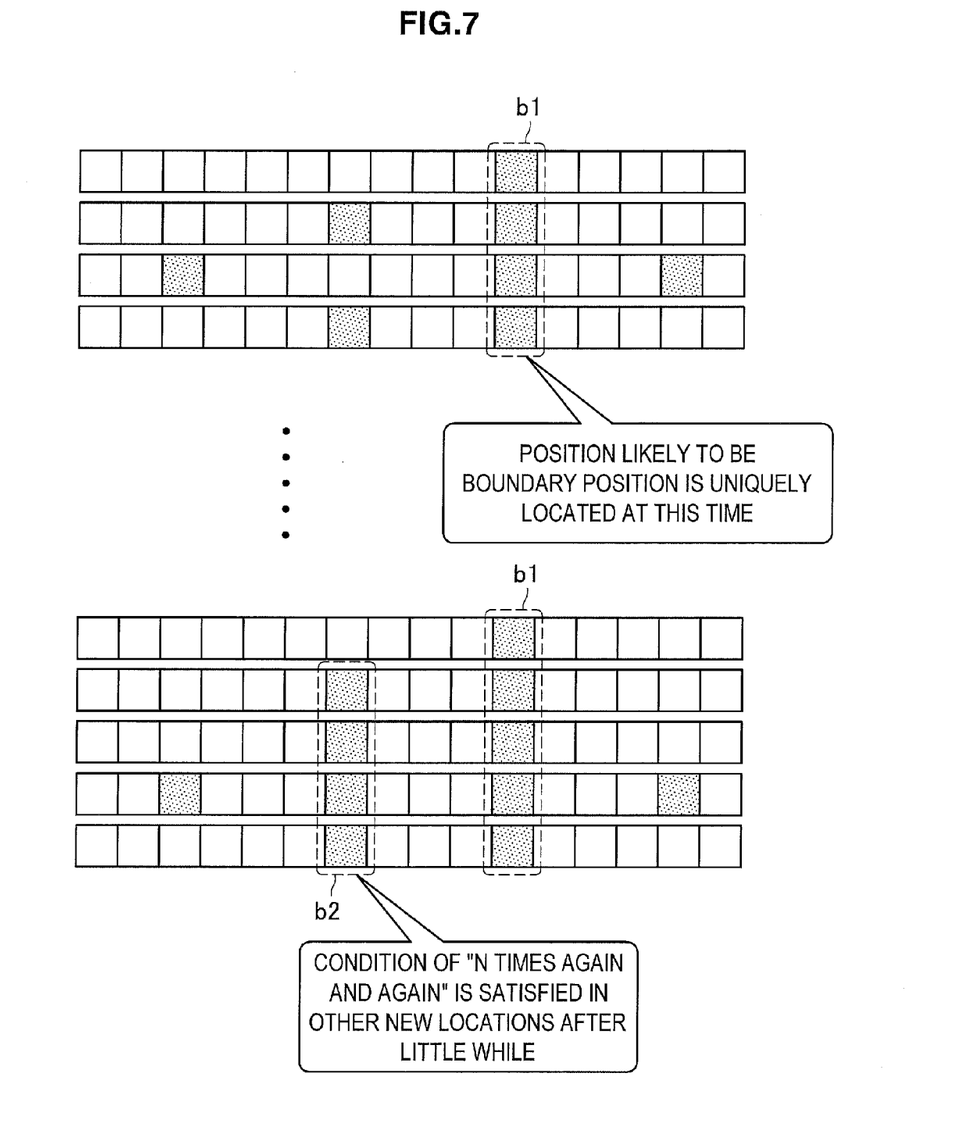
FIG. 7 is an explanatory diagram showing an example of byte data.

Now consider a case where, after receiving the data for which the packet boundary position can be uniquely located as described above, the receiving apparatus 100 receives data for which a plurality of positions appear to be packet boundary positions by the above-described occurrence of emulation. FIG. 7 is an explanatory diagram showing a state of occurrence of emulation. In the example of FIG. 7, it is assumed that the size of one packet, i.e., packet length is 16 bytes similarly to FIG. 5.

FIG. 7 shows the example in which a position likely to be the packet boundary position is uniquely located at certain time but, after a little while in a location different from the located boundary position, a byte of the same value as the synchronous byte appears N (N=4) times again and again in each 16-byte cycle at the same position. If the byte of the same value as the synchronous byte appears at the same position in a plurality of locations N times again and again in N 16-byte cycles as described above, the packet boundary position is unable to be uniquely located.

In such a case, determination criteria described so far are not intended to set guidelines as to which of those locations is to be adopted as the packet boundary. If anything, it is possible to deal with the above-described case by further adding a rule of adopting one that satisfies conditions for longer time. Nevertheless, there is no avoiding a probability that the newly appearing boundary position candidate is none other than the correct packet boundary position and that the position regarded as the packet boundary position so far changes to an emulated position. In that case, therefore, if using a method strictly compliant with the rules defined in advance as described above, the receiving apparatus 100 possibly erroneously determines the packet boundary position.

Thus, the receiving apparatus 100 according to the embodiment of the present disclosure determines one packet boundary position using the distribution of the value of each bit in each packet in the case where the packet boundary position can be uniquely located as recorded in Step S103 described above, if positions likely to be packet boundary positions appear in a plurality of locations.

If the packet boundary position is not uniquely located by the detection of the packet boundary position in Step S101 described above and a plurality of packet boundary position candidates are present as a result of the occurrence of the emulation, then the receiving apparatus 100 compares the distribution of a value of each bit starting at each packet boundary position candidate with the distribution of the value of each bit recorded in Step S103 and calculates a packet-boundary-position likelihood of each candidate (Step S104). For example, the boundary determination unit 134 may execute this process of calculating this packet-boundary-position likelihood.

It is assumed that two packet boundary position candidates are found in the circumstances in which the histogram of FIG. 6 is obtained. The two packet boundary position candidates are assumed herein as a candidate A and a candidate B. In this case, it is also assumed that a first bit right after the candidate A is 0 and a first bit right after the candidate B is 1 in the distributions of bits starting at the candidates A and B.

Referring to the histogram of FIG. 6, almost all of the first bits is 0 in the correct packet acquired before the occurrence of the emulation. Taking this into account, it can be considered that the candidate B is lower than the candidate A in the "packet-boundary-position likelihood." Therefore, if the candidates A and B are found as the packet boundary position candidates, the boundary determination unit 134 can determine that it is preferable to adopt the candidate A as the packet boundary position.

Generally, a packet often includes a header and the same value is arranged often enough at the same position in such a header part among a plurality of packets. A state in which specific bits are biased to a value of either 0 or 1 in the packets tends to occur in a stream constituted by those packets. Therefore, it is reasonable enough to estimate the packet-boundary-position likelihoods with the locations where the bits are biased to one value used as a clue.

At the time of determining a candidate position having the highest packet-boundary-position likelihood from a plurality of packet boundary position candidates as the packet boundary position (Step S105), the boundary determination unit 134 may make comparisons for predetermined three bits, for example. If it is difficult for the boundary determination unit 134 to determine the packet boundary position by the comparison for the three bits, the boundary determination unit 134 may make comparisons for the other bits. The determination of the packet boundary position while increasing the number of comparison target bits as described above can contribute to reducing an operation amount of the boundary determination unit 134.

To quantitatively calculate the "packet-boundary-position likelihood," various methods in a scope generally referred to as machine learning can be used. The quantitative calculation is described below while referring to two examples of the machine learning. Needless to say, the methods of quantitative calculating the "packet-boundary-position likelihood" according to an embodiment of the present disclosure are not limited to those described below.

(1. Vector Space Model)

As a first example, a method of quantitatively calculating the packet-boundary-position likelihood in a vector space model is described. The vector space model is one used for the classification of documents or the like. In the vector space model, each data is regarded as a vector of high dimensions, and largeness of an inner product or smallness of an angle between two of those vectors is defined as a similarity between the two corresponding data.

Taking the histogram shown in FIG. 6 as an example, this histogram can be regarded as a vector of 24 dimensions as a whole. Likewise, by regarding appearance frequencies of 0 or 1 of the 24 bits starting at each boundary position candidate as a vector, it is possible to calculate the similarity between each boundary position candidate and the correct boundary position. Therefore, the boundary determination unit 134 can select a highest-likelihood candidate as the packet boundary position by calculating the similarity between each boundary position candidate and the correct boundary position.

Figure 8:
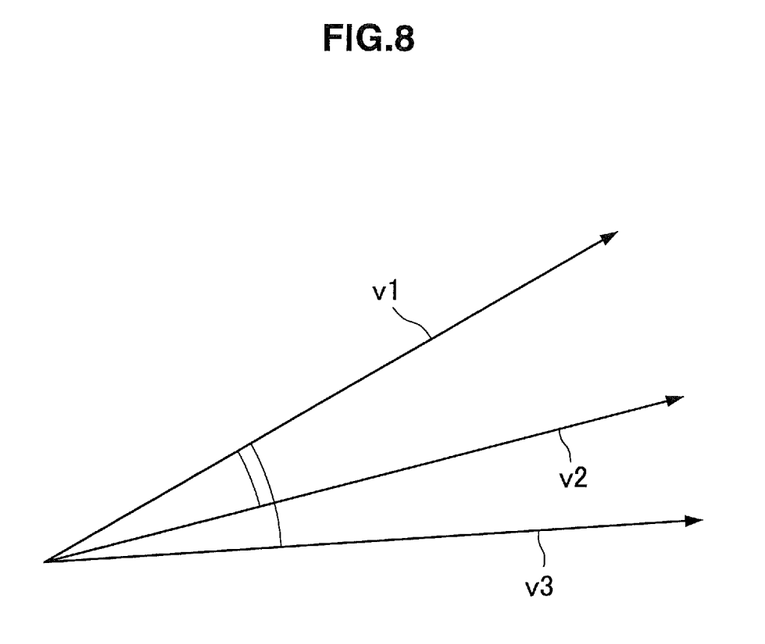
FIG. 8 is an explanatory diagram conceptually showing similarity calculation in a vector space model.

FIG. 8 is an explanatory diagram conceptually showing the calculation of the similarity in the vector space model. FIG. 8 shows an example of calculating the similarity in the vector space model using the vector of the 24 dimensions. In FIG. 8, symbol v1 denotes the vector of 24 dimensions generated from the histogram shown in FIG. 6. That is, this vector v1 is one that can be derived from the appearance frequencies of 0 or 1 of the 24 bits starting at the packet boundary position in the normal packet.

Furthermore, symbols v2 and v3 in FIG. 8 denote vectors derived from appearance frequencies of 0 or 1 of the 24 bits starting at the respective boundary position candidates. Calculation of the largeness of the inner product or the smallness of the angle between each of the vectors v2 and v3 and the vector v1 indicates that the vector v2 is more similar to the vector v1 than the vector v3. Therefore, the boundary determination unit 134 can determine that the packet boundary position candidate that forms the basis of the vector v2 is the highest likelihood boundary position.

(2. Bayes Estimation)

As a second example, a method of quantitatively calculating the packet-boundary-position likelihood by Bayes estimation is described. The Bayes estimation is to estimate a probability of occurrence of a certain event in consideration of occurrence of another event associated with the certain event. On the basis of the Bayes estimation, if a fact "x-th bit from a certain position serving as a reference position was 1" is observed, a probability that "the reference position is the true packet boundary position" is represented as the following Equation (1).

$$P(\text{position of interest is true boundary} | x\text{-th bit is } 1) = \frac{P(x\text{-th bit is } 1 | \text{position of interest is true boundary})}{P(x\text{-th bit is } 1)} P(\text{position of interest is true boundary})$$

In Equation (1), P(X) is a probability that an event X occurs, and P(X|Y) is a probability (conditional probability) that the event X occurs under condition that an event Y occurs. Equation (1) represents that in a case where the probability that position of interest that the true packet boundary position is originally estimated as the P (position of interest is true boundary), the estimation is revised as expressed by the following Equation (2) by observation of the fact (evidence) that "x-th bit was 1".

$$\frac{P(x\text{-th bit is } 1 | \text{position of interest is true boundary})}{P(x\text{-th bit is } 1)} P(\text{position of interest is true boundary})$$

According to a method referred to as Naive Bayes on the premise that a plurality of evidences are independent of one another, it suffices to do as follows so as to absorb information on a plurality of bits.

$$\frac{P(x\text{-th bit is } 1 \mid \text{position of interest is true boundary})}{P(x\text{-th bit is } 1)}$$

The estimation is sequentially changed by changing x to a position of the bit and "1" part to a value of the bit in Equation (3). These can be obtained from information on the histogram shown in FIG. 6. Therefore, the boundary determination unit 134 can select the packet boundary position candidate having the highest probability of the true boundary position from among the packet boundary position candidates by use of Bayes Estimation.

While the examples described above refer to the use of the appearance frequencies of 0 or 1 of the respective bits as features, the present disclosure is not limited to these examples. The boundary determination unit 134 may use a distribution of values in larger units, for example, in a plurality of consecutive bit sequences or in bytes as features. Since the Naive Bayes Estimation is particularly on the premise that the respective evidences are independent of one another, in a field in which a sequence of a plurality of bits is meaningful, it is more appropriate to deal with the sequence of the plurality of bits as a unit in the field.

Furthermore, as for locations where the appearance frequencies of 0 and 1 hardly appear to differ in the correct packet, the comparison of the appearance frequencies in the correct packet with those of the bit data extracted from each boundary position candidate gives only a smaller information amount. For example, in the example shown in FIG. 6, the appearance frequencies of 0 and 1 of a $21^{st}$ bit to a $24^{th}$ bit hardly differ. Therefore, the boundary determination unit 134 can use only the positions at which the distribution has biases to a certain degree or more as comparison targets. For example, in a case of using the histogram shown in FIG. 6, the boundary determination unit 134 may exclude the $21^{st}$ to $24^{th}$ bits from the comparison targets among the data of the 24 bits.

Moreover, in circumstances in which it is difficult to acquire the packets normally extracted from the stream in advance, the boundary determination unit 134 may use appearance tendencies of bits of packets in the other stream that can be acquired in advance as initial values of the histogram.

For example, a value of Transport Error Indicator or the like in the MPEG-2 TS is normally 0 in almost all cases, which tendency is common to streams. Therefore, even with the use of the appearance tendencies measured from the other stream, it is possible to give information useful to a certain degree for the boundary determination unit 134 to determine the packet boundary position.

While the above-described examples show the methods of determining the packet boundary position in the case of the occurrence of the emulation, the present disclosure is not limited to the examples. That is, the technique according to the present disclosure is available even at a time of normal detection of the synchronous byte without the emulation. For example, the boundary determination unit 134 may determine one packet boundary position candidate as the packet boundary position without waiting for the detection of the synchronous byte N times again and again in the N cycles each of which is equal to the packet length if the packet-boundary-position likelihood of the packet boundary position candidate exceeds a certain value.

2. Hardware Configuration

Figure 9:
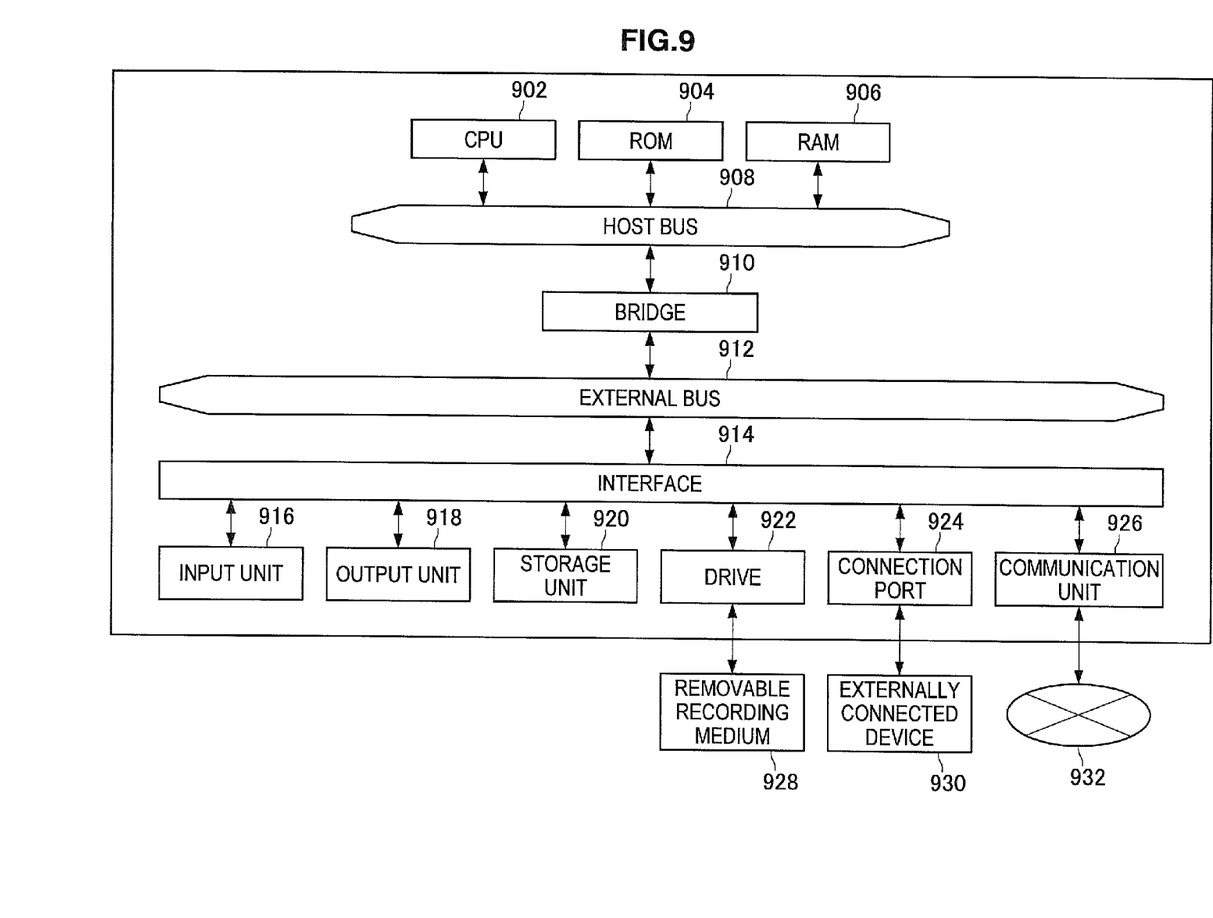
FIG. 9 is an explanatory diagram showing an example of a hardware configuration.

The operation of the receiving apparatus 100 described above can be performed by using, for example, the hardware configuration of the information processing apparatus shown in FIG. 9. That is, the operation of the receiving apparatus 100 can be realized by controlling the hardware shown in FIG. 9 using a computer program. Additionally, the mode of this hardware is arbitrary, and may be a personal computer, a mobile information terminal such as a mobile phone, a PHS or a PDA, a game machine, a contact or non-contact IC chip, a contact or non-contact IC card, or various types of information appliances. Moreover, the PHS is an abbreviation for Personal Handy-phone System. Also, the PDA is an abbreviation for Personal Digital Assistant.

As shown in FIG. 9, this hardware mainly includes a CPU 902, a ROM 904, a RAM 906, a host bus 908, and a bridge 910. Furthermore, this hardware includes an external bus 912, an interface 914, an input unit 916, an output unit 918, a storage unit 920, a drive 922, a connection port 924, and a communication unit 926. Moreover, the CPU is an abbreviation for Central Processing Unit. Also, the ROM is an abbreviation for Read Only Memory. Furthermore, the RAM is an abbreviation for Random Access Memory.

The CPU 902 functions as an arithmetic processing unit or a control unit, for example, and controls entire operation or a part of the operation of each structural element based on various programs recorded on the ROM 904, the RAM 906, the storage unit 920, or a removable recording medium 928. The ROM 904 is means for storing, for example, a program to be loaded on the CPU 902 or data or the like used in an arithmetic operation. The RAM 906 temporarily or perpetually stores, for example, a program to be loaded on the CPU 902 or various parameters or the like arbitrarily changed in execution of the program.

These structural elements are connected to each other by, for example, the host bus 908 capable of performing high-speed data transmission. For its part, the host bus 908 is connected through the bridge 910 to the external bus 912 whose data transmission speed is relatively low, for example. Furthermore, the input unit 916 is, for example, a mouse, a keyboard, a touch panel, a button, a switch, or a lever. Also, the input unit 916 may be a remote control that can transmit a control signal by using an infrared ray or other radio waves.

The output unit 918 is, for example, a display device such as a CRT, an LCD, a PDP or an ELD, an audio output device such as a speaker or headphones, a printer, a mobile phone, or a facsimile, that can visually or auditorily notify a user of acquired information. Moreover, the CRT is an abbreviation for Cathode Ray Tube. The LCD is an abbreviation for Liquid Crystal Display. The PDP is an abbreviation for Plasma Display Panel. Also, the ELD is an abbreviation for Electro-Luminescence Display.

The storage unit 920 is a device for storing various data. The storage unit 920 is, for example, a magnetic storage device such as a hard disk drive (HDD), a semiconductor storage device, an optical storage device, or a magneto-optical storage device. The HDD is an abbreviation for Hard Disk Drive.

The drive 922 is a device that reads information recorded on the removable recording medium 928 such as a magnetic disk, an optical disk, a magneto-optical disk, or a semiconductor memory, or writes information in the removable recording medium 928. The removable recording medium 928 is, for example, a DVD medium, a Blu-ray medium, an HD-DVD medium, various types of semiconductor storage media, or the like. Of course, the removable recording medium 928 may be, for example, an electronic device or an IC card on which a non-contact IC chip is mounted. The IC is an abbreviation for Integrated Circuit.

The connection port 924 is a port such as an USB port, an IEEE1394 port, a SCSI, an RS-232C port, or a port for connecting an externally connected device 930 such as an optical audio terminal. The externally connected device 930 is, for example, a printer, a mobile music player, a digital camera, a digital video camera, or an IC recorder. Moreover, the USB is an abbreviation for Universal Serial Bus. Also, the SCSI is an abbreviation for Small Computer System Interface.

The communication unit 926 is a communication device to be connected to a network 932, and is, for example, a communication card for a wired or wireless LAN, Bluetooth (registered trademark), or WUSB, an optical communication router, an ADSL router, or a device for contact or non-contact communication. The network 932 connected to the communication unit 926 is configured from a wire-connected or wirelessly connected network, and is the Internet, a home-use LAN, infrared communication, visible light communication, broadcasting, or satellite communication, for example. Moreover, the LAN is an abbreviation for Local Area Network. Also, the WUSB is an abbreviation for Wireless USB. Furthermore, the ADSL is an abbreviation for Asymmetric Digital Subscriber Line.

3. Conclusion

As described so far, one embodiment of the present disclosure provides the receiving apparatus 100 that determines the highest packet-boundary-position likelihood candidate as the packet boundary position at a time of determining the packet boundary position by the detection of the synchronous byte. At a time of determining the candidate having the highest packet-boundary-position likelihood as the packet boundary position, the receiving apparatus 100 compares the distribution of the values of the bits in the correctly received packets with the distribution of the values of the bits from each candidate set as the reference position.

The receiving apparatus 100 according to one embodiment of the present disclosure can determine the higher packet-boundary-position likelihood candidate as the packet boundary position by comparing the distribution of the values of the bits in the correctly received packets with the distribution of the values of the bits from each candidate set as the reference position. Therefore, the receiving apparatus 100 according to the embodiment of the present disclosure can determine the packet boundary position with higher accuracy by selecting the packet boundary position more matching features of packets actually transmitted so far if it becomes difficult for the receiving apparatus 100 to uniquely locate the packet boundary position because of the occurrence of the emulation or the like.

The receiving apparatus 100 according to one embodiment of the present disclosure can use the features of the data itself contained in the packets as the clue for determining the packet boundary position, and can, therefore, avoid the degradation in the transmission efficiency as compared with a technique that may want a new fixed value (irrespective of actual data) to be contained in packets.

The receiving apparatus 100 according to one embodiment of the present disclosure can decrease the number of confirmation times based on the synchronous byte if one candidate can be judged as the sufficiently high-likelihood packet boundary position when it becomes temporarily difficult for the receiving apparatus 100 to locate the packet boundary because of a transmission path problem or the like even in the circumstances in which the emulation does not occur. Therefore, the receiving apparatus 100 according to the embodiment of the present disclosure can quickly recover synchronization while maintaining certain accuracy.

For example, it may not be necessary to chronologically execute respective steps in the processing, which is executed by each apparatus of this specification, in the order described in the sequence diagrams or the flow charts. For example, the respective steps in the processing which is executed by each apparatus may be processed in the order different from the order described in the flow charts, and may also be processed in parallel.

Furthermore, it becomes possible to generate a computer program which makes a hardware device, such as a CPU, a ROM, and a RAM incorporated in each apparatus demonstrate the functions equivalent to the configurations of the above described apparatuses. It becomes also possible to provide a storage medium which stores the computer program. In addition, respective functional blocks shown in the functional block diagrams may be constituted from hardware devices, so that a series of processings may be implemented by the hardware devices.

While the preferred embodiments of the present disclosure have been described so far with reference to the accompanying drawings, the present disclosure is not limited to these examples. It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) A receiving apparatus including:
a position detection unit configured to detect a position at which same information as predetermined synchronous information is present from an acquired stream; and
a boundary determination unit configured to determine positions at which the same information as the synchronous information detected by the position detection unit appears N times, where N>1, again and again in N cycles each of which is equal to a packet length, as a packet boundary position of the stream,
wherein the boundary determination unit determines the packet boundary position on the basis of a packet-boundary-position likelihood of the positions of the same information as the synchronous information in a case where the packet boundary position is unable to be uniquely located.

(2) The receiving apparatus according to (1),
wherein the boundary determination unit determines the packet boundary position by counting number of appearances of a value of each bit at and after the packet boundary position in a case where the packet boundary position is able to be uniquely located, and determines the packet boundary position by using the counted number of appearances of the value in a case where the packet boundary position is unable to be uniquely located.

(3) The receiving apparatus according to (2),
wherein the boundary determination unit determines the packet boundary position by machine learning.

(4) The receiving apparatus according to (3),
wherein the boundary determination unit determines the packet boundary position using a vector space model.

(5) The receiving apparatus according to (3), wherein the boundary determination unit determines the packet boundary position using Bayes Estimation.

(6) The receiving apparatus according to any one of (1) to (5), wherein the boundary determination unit determines the packet boundary position on the basis of the packet-boundary-position likelihood of the positions of the same information as the synchronous information in a case where a plurality of candidates for the packet boundary position are present in a range of the packet length.

(7) The receiving apparatus according to any one of (1) to (6), wherein the boundary determination unit determines the packet boundary position on the basis of the packet-boundary-position likelihood of the positions of the same information as the synchronous information even before the same information as the synchronous information appears N times again and again in the N cycles each of which is equal to the packet length.

(8) A packet-boundary determination method including:
detecting a position at which same information as predetermined synchronous information is present from an acquired stream; and
determining positions at which the same information as the synchronous information detected in the detecting appears N times, where N>1, again and again in N cycles each of which is equal to a packet length, as a packet boundary position of the stream,
wherein in the determining, the packet boundary position is determined on the basis of a packet-boundary-position likelihood of the positions of the same information as the synchronous information in a case where the packet boundary position is unable to be uniquely located.

(9) A computer program causing a computer to execute:
detecting a position at which same information as predetermined synchronous information is present from an acquired stream; and
determining positions at which the same information as the synchronous information detected in the detecting appears N times, where N>1, again and again in N cycles each of which is equal to a packet length, as a packet boundary position of the stream,
wherein in the determining, the packet boundary position is determined on the basis of a packet-boundary-position likelihood of the positions of the same information as the synchronous information in a case where the packet boundary position is unable to be uniquely located.

What is claimed is:

1. A receiving apparatus comprising:
   processors configured to:
   detect a position at which same information as predetermined synchronous information is present from an acquired stream; and
   determine positions at which the same information as the predetermined synchronous information detected by the one or more processors appears N times, where N is an integer and greater than 1, again and again in N cycles each of which is equal to a packet length, as a packet boundary position of the stream,
   wherein the packet boundary position is determined on the basis of a packet-boundary-position likelihood of the positions of the same information as the synchronous information in a case where the packet boundary position is unable to be uniquely located, and
   wherein the packet boundary position is determined by counting number of appearances of a value of each bit at or after the packet boundary position in a case where the packet boundary position is able to be uniquely located, and the packet boundary position is determined by using the counted number of appearances of the value in a case where the packet boundary position is unable to be uniquely located.

2. The receiving apparatus according to claim 1, wherein the processors are further configured to determine the packet boundary position by machine learning.

3. The receiving apparatus according to claim 2, wherein the processors are further configured to determine the packet boundary position using a vector space model.

4. The receiving apparatus according to claim 2, wherein the processors are further configured to determine the packet boundary position using Bayes Estimation.

5. The receiving apparatus according to claim 1, wherein the processors are further configured to determine the packet boundary position on the basis of the packet-boundary-position likelihood of the positions of the same information as the predetermined synchronous information in a case where a plurality of candidates for the packet boundary position are present in a range of the packet length.

6. The receiving apparatus according to claim 1, wherein the processors are further configured to determine the packet boundary position on the basis of the packet-boundary-position likelihood of the positions of the same information as the predetermined synchronous information even before the same information as the predetermined synchronous information appears N times again and again in the N cycles each of which is equal to the packet length.

7. A packet-boundary determination method comprising:
   detecting a position at which same information as predetermined synchronous information is present from an acquired stream; and
   determining positions at which the same information as the predetermined synchronous information detected in the detecting appears N times, where N is an integer and greater than 1, again and again in N cycles each of which is equal to a packet length, as a packet boundary position of the stream,
   wherein in the determining, the packet boundary position is determined on the basis of a packet-boundary-position likelihood of the positions of the same information as the predetermined synchronous information in a case where the packet boundary position is unable to be uniquely located, and
   wherein the packet boundary position is determined by counting number of appearances of a value of each bit at or after the packet boundary position in a case where the packet boundary position is able to be uniquely located, and the packet boundary position is determined by using the counted number of appearances of the value in a case where the packet boundary position is unable to be uniquely located.

8. A non-transitory computer-readable medium with a set of computer-executable instructions embodied thereon for causing a computer to execute:
   detecting a position at which same information as predetermined synchronous information is present from an acquired stream; and
   determining positions at which the same information as the predetermined synchronous information detected in the detecting appears N times, where N is an integer and greater than 1, again and again in N cycles each of which is equal to a packet length, as a packet boundary position of the stream,
   wherein in the determining, the packet boundary position is determined on the basis of a packet-boundary-position likelihood of the positions of the same information as the predetermined synchronous information in a case where the packet boundary position is unable to be uniquely located, and wherein the packet boundary position is determined by counting number of appearances of a value of each bit at or after the packet boundary position in a case where the packet boundary position is able to be uniquely located, and the packet boundary position is determined by using the counted number of appearances of the value in a case where the packet boundary position is unable to be uniquely located.

* * * * *